United States Patent [19]

Ichikawa et al.

[11] Patent Number: 5,267,162
[45] Date of Patent: Nov. 30, 1993

[54] ANTI-SKID CONTROL SYSTEM FOR AN AUTOMOTIVE VEHICLE

[75] Inventors: Hiroyuki Ichikawa, Okazaki; Kazutaka Kuwana, Toyota; Kuniaki Okamoto, Nagoya; Tsuyoshi Yoshida, Obu; Masaru Kamikado, Anjo; Nobuyasu Nakanishi, Toyota; Tatsuo Sugitani, Mishima; Kazunori Sakai, Nishikamo, all of Japan

[73] Assignees: Aisin Seiki Kabushiki Kaisha, Kariya; Toyota Jidosha Kabushiki Kaisha, Toyota, both of Japan

[21] Appl. No.: 946,776

[22] Filed: Sep. 18, 1992

Related U.S. Application Data

[63] Continuation of Ser. No. 563,384, Aug. 7, 1990, abandoned.

[30] Foreign Application Priority Data

Aug. 7, 1989 [JP] Japan .................. 1-204424

[51] Int. Cl.$^5$ .............................................. B60T 8/32
[52] U.S. Cl. .................. 364/426.02; 303/95; 303/103; 303/110
[58] Field of Search .......... 364/426.02, 95, 97, 364/100, 103, 110, 426.01; 303/92; 180/197

[56] References Cited

U.S. PATENT DOCUMENTS

| | | | |
|---|---|---|---|
| 4,739,484 | 4/1988 | Fennel | 364/426.02 |
| 4,807,133 | 2/1989 | Shimanuki et al. | 364/426.02 |
| 4,842,343 | 6/1989 | Akiyoshi et al. | 303/103 |
| 4,859,002 | 8/1989 | Yoshino | 303/103 |
| 4,870,582 | 9/1989 | Hoashi et al. | 364/426.02 |
| 4,883,326 | 11/1989 | Sugitani et al. | 303/110 |
| 4,930,083 | 5/1990 | Hoashi et al. | 364/426.02 |

FOREIGN PATENT DOCUMENTS

48-44236 12/1973 Japan .

Primary Examiner—Thomas G. Black
Assistant Examiner—Collin W. Park
Attorney, Agent, or Firm—Sughrue, Mion, Zinn, Macpeak & Seas

[57] ABSTRACT

An anti-skid control system for an automotive vehicle is provided with an actuator which is disposed in a hydraulic circuit between a pressure generator and a wheel brake cylinder. The actuator is arranged to control the hydraulic braking pressure applied to the wheel brake cylinder. In response to a wheel speed detected by a wheel speed detector, it is determined in an electronic control unit whether a condition for decreasing the braking pressure is effected. When this condition is effected, the decrease mode is provided in the control unit. When a predetermined period of time lapses after the decrease mode is initiated, the decrease mode is turned to a pressure control mode for applying the braking pressure to prevent the road wheel from being locked. When the condition is not effected during the predetermined period of time after the decrease mode is initiated, the decrease mode is turned to a direct supply mode for directly communicating the pressure generator with the wheel brake cylinder. Consequently, the lack of braking force caused by the delay of timing for decreasing the hydraulic braking pressure due to an erroneous detection of a locking condition of the road wheel on a rough road is effectively prevented.

6 Claims, 7 Drawing Sheets

ANTI-SKID CONTROL SYSTEM FOR AN AUTOMOTIVE VEHICLE

This is a Continuation of Application No. 07/563,384 filed Aug. 7, 1990, now abandoned.

BACKGROUND OF THE INVENTION

1. Field of the Invention

The present invention relates to an anti-skid control system for use in an automotive vehicle, and more particularly to an anti-skid control system for controlling a braking force applied to road wheels in braking operation to prevent the road wheels from being locked.

2. Description of the Prior Art

It is known that the vehicle stability or the controllability is influenced detrimentally depending upon the road surface condition, when road wheels are locked in abrupt braking operation. In order to prevent the road wheels from being locked, therefore, there has been employed an anti-skid control system which controls the braking force by decreasing, increasing, or holding a hydraulic braking pressure supplied to wheel brake cylinders, and which is also called as an anti-locking control system. The anti-skid control system includes the system for the rear road wheels and that for front and rear road wheels, i.e., four wheel control system. In the case where the road wheels are prevented from being locked according to the former system, the running stability may be ensured and the stopping distance may be minimized. In the case where the front road wheels are also prevented from being locked according to the latter system, the controllability may be maintained.

In view of the fact that, when a hydraulic braking pressure supplied to each wheel brake cylinder is increased, the rotational speed of the road wheel is rapidly reduced immediately before the coefficient of friction relative to the road wheel reaches a maximum, the anti-skid control system controls the wheel cylinder pressure according to the deceleration of the vehicle in order that a slip rate of the road wheel results in around 20%, that is, the maximum coefficient of friction is obtained.

The above anti-skid control system is disclosed in Japanese Patent Publication No. Sho 48-44236, for example, wherein it is determined that a road wheel is in a locking condition, when a decreasing rate of the wheel speed is more than a predetermined value in a rapid braking operation of the vehicle. Then, the anti-skid control is initiated to decrease the hydraulic braking pressure in the wheel brake cylinder. When the decreasing rate of the wheel speed is less than the predetermined value, the hydraulic braking pressure in the wheel brake cylinder is increased until the time when an angular acceleration of the road wheel will reach to the value which corresponds to the angular acceleration memorized during the decreasing mode in the rapid braking operation, thereafter it is increased more gradually comparing with the increasing speed of the hydraulic braking pressure which corresponds to the above angular acceleration.

Thus, in the prior system disclosed in the above publication, when the decreasing rate of the wheel speed is more than the predetermined value, the locking condition of the road wheel is detected, so that the anti-skid control is initiated. Therefore, in the case where the vehicle is running on a rough road, or the road wheel rides on protrusions of the road, or in the case where the wheel speed is momentarily decreased due to backlash of gears in a power train in the anti-skid control system for preventing only driven wheels from being locked, the decreasing rate of the wheel speed may become more than the predetermined value, whereby the locking condition of the road wheel may be erroneously detected to initiate the anti-skid control. Consequently, if the erroneous detection of the locking condition is made immediately after the initiation of braking operation, the anti-skid control will be initiated before the hydraulic braking pressure in the wheel brake cylinder will reach to a sufficient value, and the hydraulic braking pressure in the wheel brake cylinder will be gradually increased, so that the stopping distance will be extended due to lack of braking force.

SUMMARY OF THE INVENTION

Accordingly, it is an object of the present invention to provide an anti-skid control system for an automotive vehicle which ensures a sufficient braking force by properly detecting a locking condition of a road wheel in braking operation.

In accomplishing the above and other objects, an anti-skid control system for an automotive vehicle is installed in a vehicle braking system which has a wheel brake cylinder for applying a braking force to a road wheel and pressure generating means for supplying a hydraulic braking pressure to the wheel brake cylinder The anti-skid control system comprises actuating means which is disposed in a hydraulic circuit between the pressure generating means and the wheel brake cylinder and which controls the hydraulic braking pressure applied to the wheel brake cylinder, wheel speed detecting means for detecting a wheel speed of the road wheel, determination means for determining in response to the wheel speed detected by the wheel speed detecting means whether a condition for decreasing the hydraulic braking pressure applied to the wheel brake cylinder is effected, and pressure control means for controlling the actuating means in response to a result of determination in the determination means. The pressure control means providing a decrease mode for decreasing said hydraulic braking pressure applied to said wheel brake cylinder a direct supply mode for directly communicating the pressure generating means with the wheel brake cylinder and a pressure control mode for controlling the hydraulic braking pressure applied to the wheel brake cylinder to prevent the road wheel from being locked.

The pressure control means initiates the decrease mode when the condition is effected in said determination means, turns said decrease mode to said pressure control mode when a predetermined period of time lapses after said decrease mode is initiated, and turns said decrease mode to said direct supply mode when said condition is not effected in said determination means during said predetermined period of time after said decrease mode is initiated.

In the above-described anti-skid control system, the determination means is preferably arranged to provide a wheel acceleration of the road wheel calculated from the wheel speed and determine that the above condition is effected when the wheel speed is less than a predetermined speed and the wheel acceleration is less than a predetermined acceleration.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
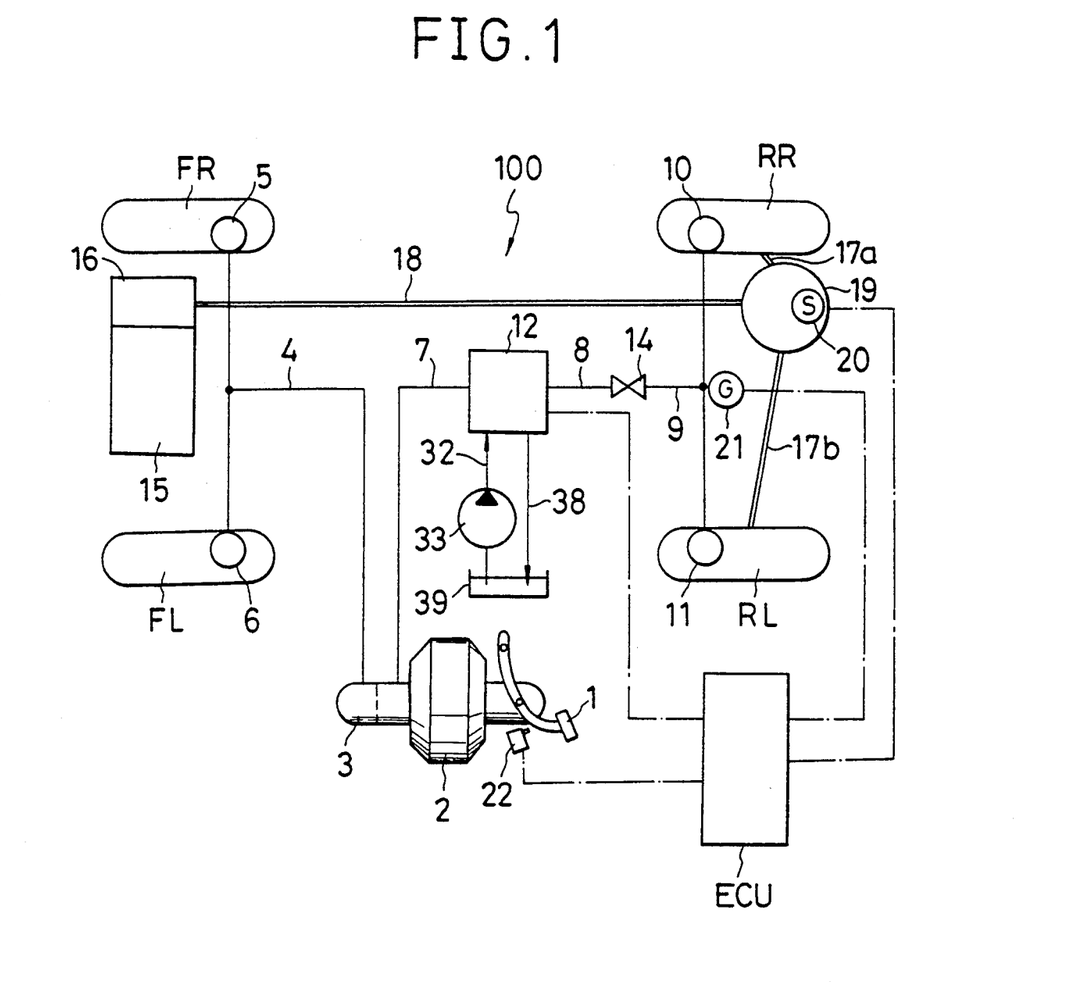
FIG. 1 is a schematic block diagram of an anti-skid control system of an embodiment of the present invention.

Referring to FIG.1, there is illustrated an anti-skid control system which controls a hydraulic braking pressure in only each of wheel brake cylinders 10, 11 of the rear road wheels RR, RL, i.e., the driven wheels for a vehicle of front engine-rear drive in response to the braking conditions of the road wheels RR, RL. Each of wheel brake cylinders 5, 6 of the front road wheels FR, FL is directly connected to a master cylinder 3. The above anti-skid control system is preferably applied for a vehicle whose load supported by the rear road wheels RR, RL varies largely, such as a small size truck or bus. The present invention is applicable to the four wheels anti-skid control system.

The master cylinder 3 is operated in response to depression of a brake pedal 1 by a driver and boosted by a vacuum booster 2, so that it produces a hydraulic braking pressure in response to the depressed power by the driver. In this embodiment, the master cylinder 3 is a tandem master cylinder connected to the wheel brake cylinders 5, 6 through a hydraulic circuit 4. When the hydraulic braking pressure of the master cylinder 3 is applied to the wheel brake cylinders 5, 6, the front road wheels FR, FL are braked. The master cylinder 3 is connected to the wheel brake cylinders 10, 11 through hydraulic circuits 7, 8 and 9, so that when the hydraulic braking pressure of the master cylinder 3 is applied to the wheel brake cylinders 10, 11, the rear road wheels RR, RL are braked.

Between the hydraulic circuits 7 and 8, there is provided with an actuator 12 which is operated by a hydraulic pressure generated from a pressure pump 13 driven by an engine 15. The actuator 12 regulates the hydraulic braking pressure applied to the wheel brake cylinders 10, 11 in response to the outputs of an electronic control unit ECU. In the present embodiment, between the hydraulic circuits 8 and 9, there is provided a load sensing pressure control valve (LSPV) 14 which reduces the increasing gradient of the hydraulic braking pressure in the wheel brake cylinders 10, 11 comparing with the increasing gradient of the hydraulic braking pressure generated from the master cylinder 3, in response to a carrying load of the vehicle.

A transmission 16 is connected with the engine 15 to change a gear ratio for reducing a rotational speed of the engine 15 transmitted to a propeller shaft 18. Rotational outputs of the transmission 16 is transmitted to a speed of the propeller shaft 18 to transmit the rotation thereof to the rear road wheels RR, RL. The differential gear 19 is provided with a wheel speed sensor 20 which detects an average wheel speed of the rear road wheels RR, RL. In order to detect the acceleration of the vehicle, an acceleration sensor 21 is fixed to an appropriate position of the vehicle where vibrations from the road or the engine 15 are hardly transmitted. The acceleration sensor 21 is of a known type, such as a mercury switch type or a pendulum type. In the vicinity of the brake pedal 1, there is provided a brake switch 22 for lighting a brake lamp (not shown), which switch is turned on when the brake pedal 1 is depressed. The electronic control unit ECU receives electrid signals from the wheel speed sensor 20, acceleration sensor 21 and brake lump 22, and outputs electric signals to control the actuator 12.

Figure 2:
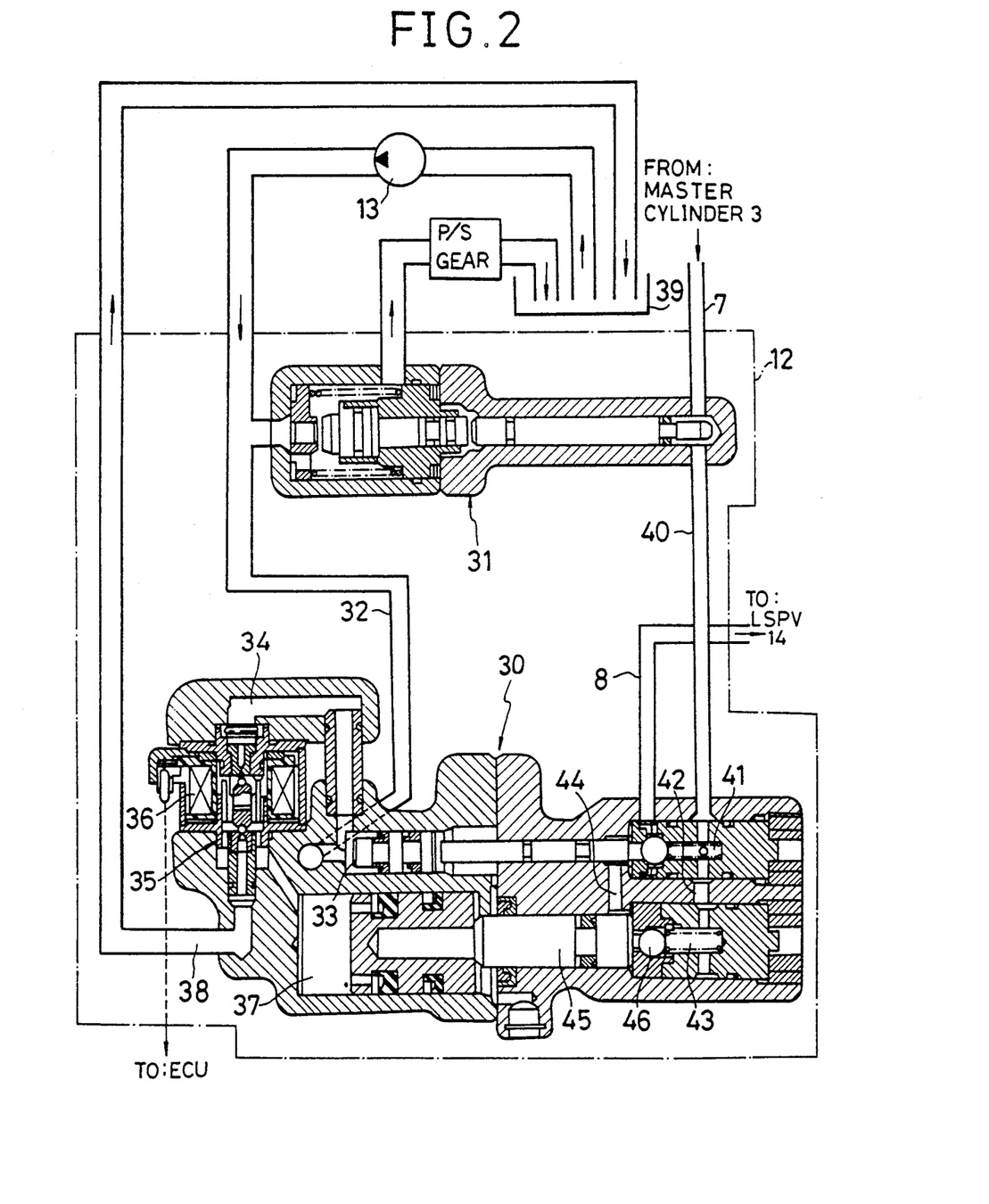
FIG. 2 is a sectional view of an actuator of an embodiment of the present invention.

FIG. 2 illustrates the actuator 12 which is a well known actuator with is volume varied. The actuator 12 includes a pressure control valve 30 and a regulator valve 31 which regulates the hydraulic pressure generated by the pressure pump 13 to maintain a certain ratio thereof to the hydraulic braking pressure generated by the master cylinder 3. The hydraulic pressure regulated by the regulator valve 31 is supplied to the hydraulic circuit 34 through the hydraulic circuit 32 and a fluid chamber 33. Then, the hydraulic pressure in the hydraulic circuit 34 is introduced into a fluid chamber 37 through a changeover valve 35. Consequently, the hydraulic braking pressure generated by the master cylinder 3 is applied to the wheel brake cylinders 10, 11 through hydraulic circuits 7 and 40, a bypass valve 41, a hydraulic circuit 42, a cut-off valve 43, and hydraulic circuits 44 and 8.

The changeover valve 35 communicates the fluid chamber 37 with the hydraulic circuit 34 when a solenoid 36 is not energized, whereas it communicates the fluid chamber 37 with the hydraulic circuit 38 communicating with the reservoir 39 when the solenoid 36 is energized. When the solenoid 36 of the changeover valve 35 is energized, therefore, the hydraulic pressure in the fluid chamber 37 is discharged to the reservoir 39 through the hydraulic circuit 38. Consequently, with the hydraulic pressure in the fluid chamber 37 decreased, a piston 45 moves to the left in FIG. 2 to reduce the volume of the fluid chamber 37. When the piston 45 is positioned in the left side in FIG. 2, the communication between the cut-off valve 43 and the hydraulic circuit 44 is shut off by a ball 46. When the hydraulic pressure in the fluid chamber 37 is further decreased, the volume at the side of the wheel brake cylinders 10, 11 is increased with the piston 45 moved, so that the hydraulic braking pressure applied to the wheel brake cylinders 10, 11 is decreased. When the solenoid 36 is deenergized in this state, the fluid chamber 37 and the hydraulic circuit 34 are communicated with each other through the changeover valve 35, so that the hydraulic pressure in the fluid chamber 37 is increased. With the hydraulic pressure in the fluid chamber 37 increased, the piston 45 moves to the right in FIG. 2 to reduce the volume at the side of the wheel brake cylinders 10, 11, so that the hydraulic braking pressure applied to the wheel brake cylinders 10, 11 is increased. Accordingly, the hydraulic braking pressure in the wheel brake cylinders 10, 11 is decreased when the solenoid 36 of the changeover valve 35 is energized, whereas the hydraulic braking pressure in the wheel brake cylinders 10, 11 is increased when the solenoid 35 is not energized. Thus, in the present embodiment, the hydraulic braking pressure in the wheel brake cylinders 10, 11 are controlled in response to a duty ratio of the electric signal fed to the solenoid 36 of the changeover valve 35.

Figure 3:
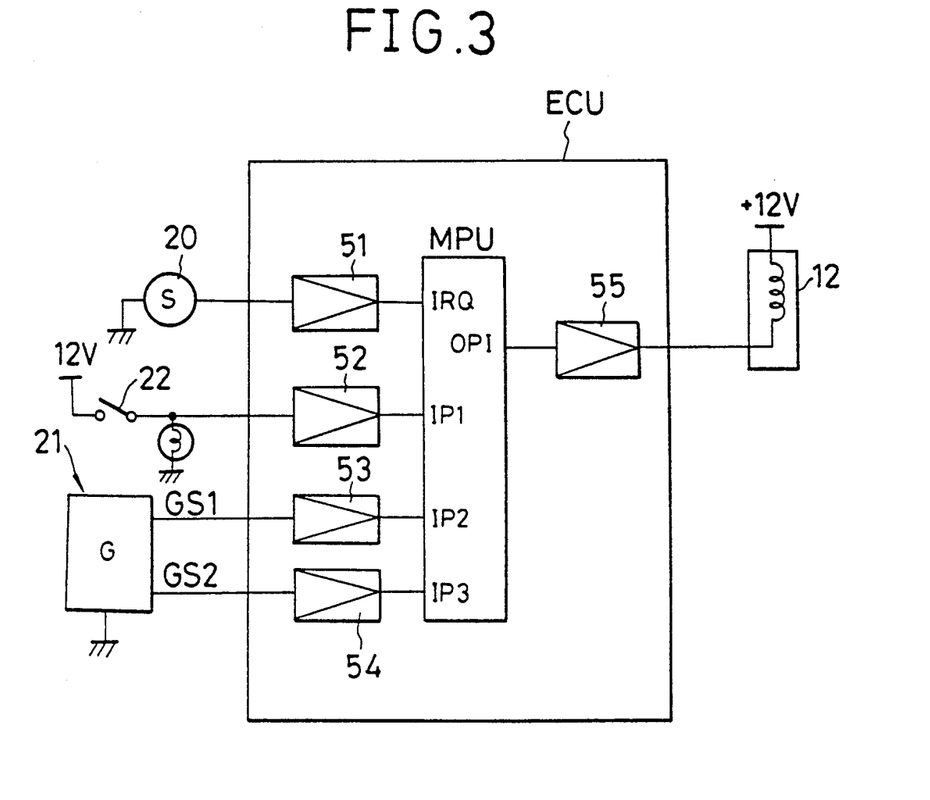
FIG. 3 is a block diagram illustrating the arrangement of an electronic control unit shown in FIG.1.

Next will be explained with reference to FIG. 3 the electronic control unit ECU, which is provided with a microprocessor MPU, a waveform shaping circuit 51, input buffers 52, 53, 54 and an output buffer 55. As the microprocessor MPU, employed is an one-chip microcomputer on the market, which includes a free-run timer for providing a present time, a read-only memory or ROM for storing a program, a random access memory or RAM for reading and writing data to execute the program, and a solenoid timer for determining a period for energizing the solenoid 36.

Figure 4:
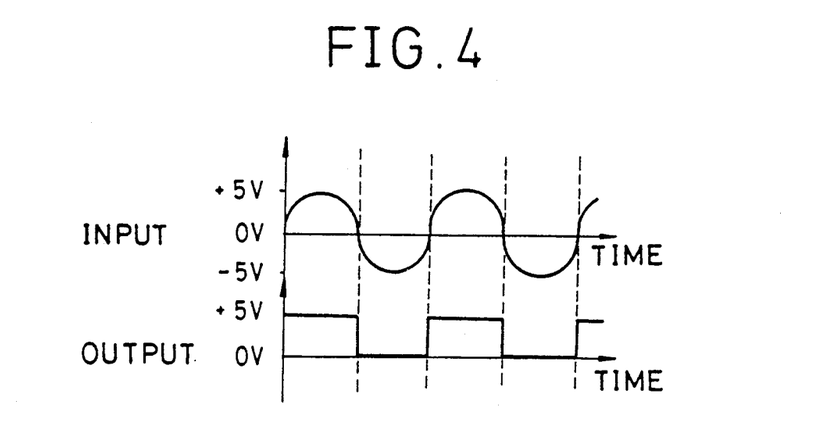
FIG. 4 is a timing chart illustrating a characteristic of a waveform shaping circuit of an embodiment of the present invention.

A timing chart of the waveform shaping circuit 51 is shown in FIG. 4, wherein a sine-wave signal transmitted by the wheel speed sensor 20 is converted into a square-wave signal through the waveform shaping circuit 51 and fed to an interruption port IRQ of the microprocessor MPU. Thus, the microprocessor MPU is interrupted with a time interval determined in response to the wheel speed detected by the wheel speed sensor 20.

There is shown in the following Table 1 a characteristic of the input buffer 52 by which the ON or OFF condition of the brake switch 22 is fed to an input port IP1 of the microprocessor MPU.

TABLE 1

| Switch | Conditions | Buffer outputs |
|---|---|---|
| Brake switch 22 | ON | H |
|  | OFF | L |

Next, in the following Table 2, the characteristics of the input buffers 53, 54 are shown. The acceleration sensor 21 is so arranged that it detects the vehicle acceleration with 2 bits, and the detected signals are fed from the terminals GS1, GS2 to the input ports IP2, IP3 of the microprocessor MPU through the input buffers 53, 54. The output buffer 55 is connected to the output port OP1 of the microprocessor MPU, and arranged to amplify the electric signals output from the output port OP1 and energize the solenoid 36 of the actuator 12. The electric signal output from the output port OP1 is controlled in accordance with a program routine executed by the microprocessor MPU.

TABLE 2

| Acceleration | terminals | Buffer outputs |
|---|---|---|
| Below −0.4 G | GS1 | H |
|  | GS2 | H |
| −0.4 G to −0.2 G | GS1 | L |
|  | GS2 | H |
| −0.2 G to 0.2 G | GS1 | L |
|  | GS2 | L |

TABLE 2-continued

| Acceleration | terminals | Buffer outputs |
|---|---|---|
| 0.2 G to 0.4 G | GS1 | L |
|  | GS2 | H |
| Over 0.4 G | GS1 | H |
|  | GS2 | H |

Figure 5:
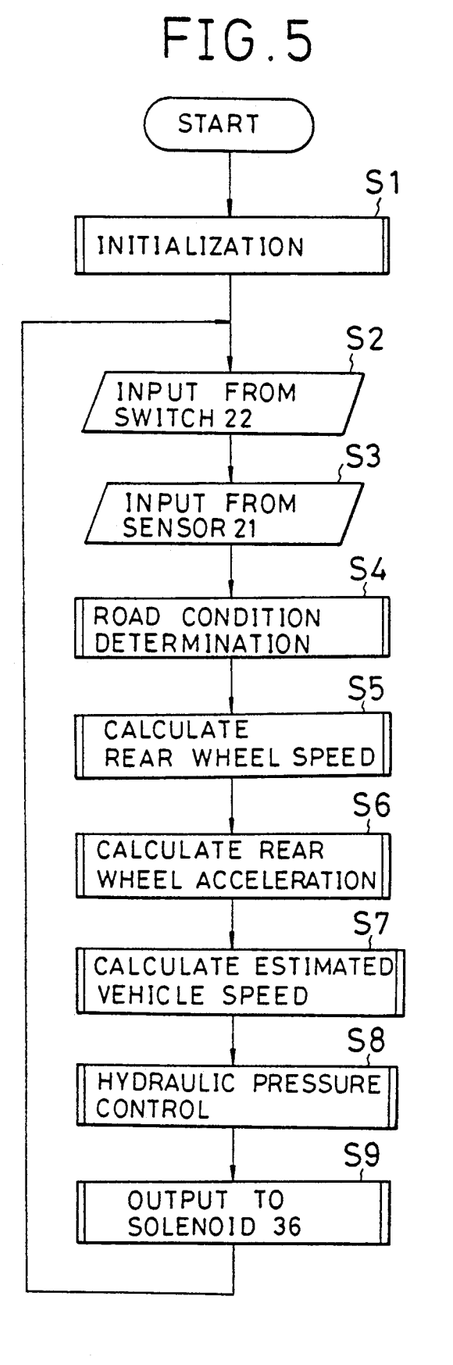
FIG. 5 is a flowchart showing a main routine executed in a microprocessor according to an embodiment of the present invention.
Figure 6:
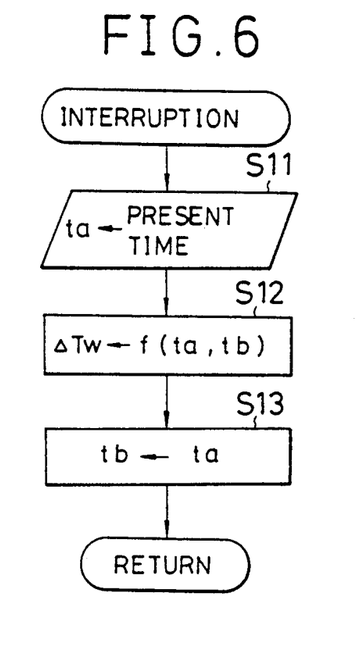
FIG. 6 is a flowchart showing an interruption routine executed in the microprocessor.
Figure 7:
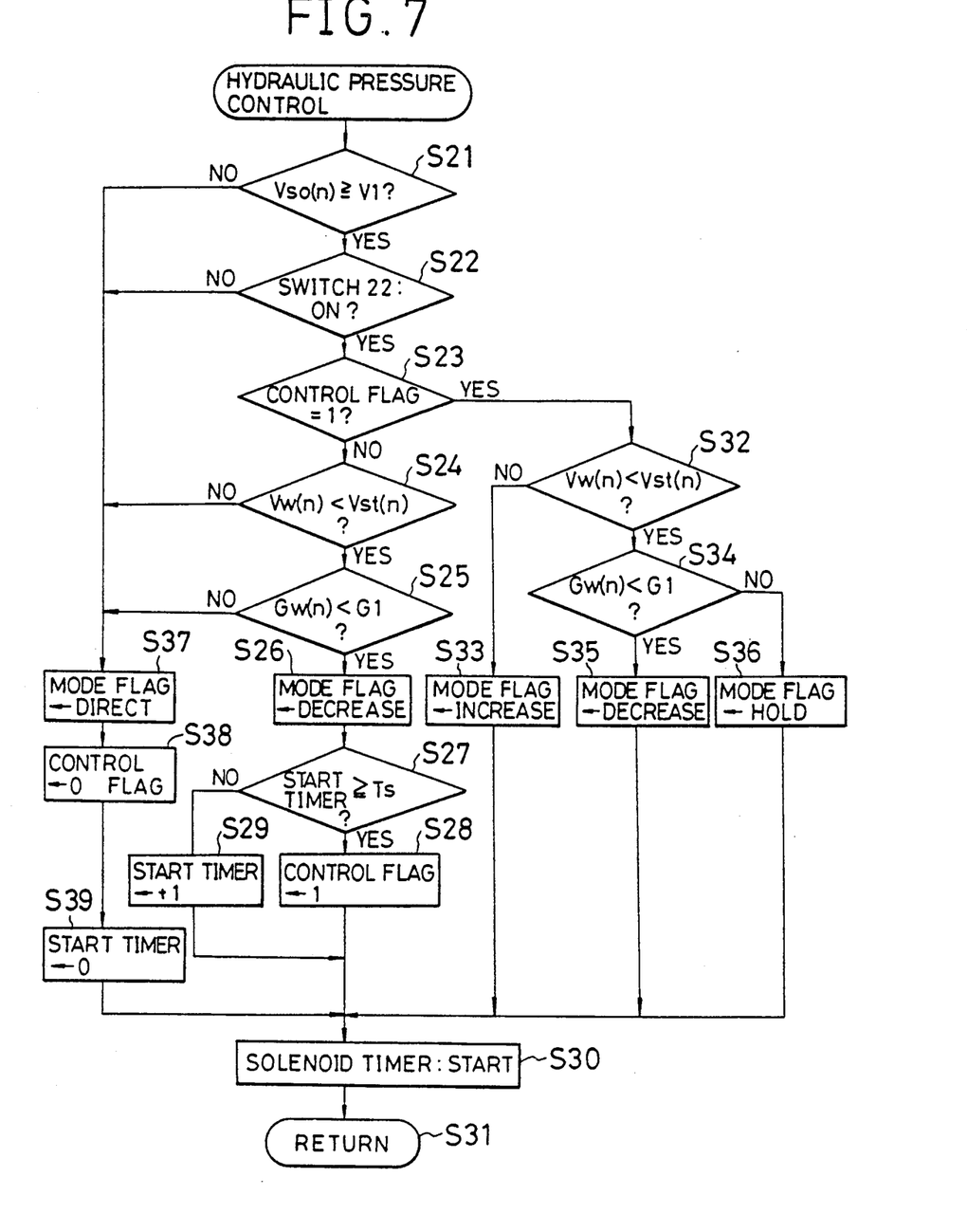
FIG. 7 is a flowchart showing a subroutine executed in the microprocessor.

FIGS. 5 to 7 show the flowcharts for the program, which includes a main routine shown in FIG. 5 and an interruption routine shown in FIG. 6 which is executed when an input signal is fed to the interruption port IRQ.

In FIG. 5, the program routine starts when a power source to the electronic control unit ECU is turned on, and provides for initialization of the system at Step S1, wherein flags ta, tb and a control flag are set to be zero, and an output from the output port OP1 is arranged to de-energize the solenoid 36. Then, the program proceeds to Step S2 where the signal representing the condition of the brake switch 22 is fed to the microprocessor MPU. Next, the program proceeds to Step S3 where the signals are fed to the input ports IP2, IP3 of the microprocessor MPU through the input buffers 53, 54. Then, at Step S4 the determination of the road condition or the coefficient of friction of the road surface is executed on the basis of the following Table 3, wherein CF corresponds to the coefficient of friction.

TABLE 3

| IP2 | L | L | H |
|---|---|---|---|
| IP3 | L | H | H |
| Road condition | Low-CF | Mid.-CF | High-CF |

The program proceeds further to Step S5 where an average vehicle speed Vw of the rear road wheels RR, RL is calculated on the basis of a period ΔTw of the signal output from the wheel speed sensor 20, in accordance with the following equation:

$$Vw = K/\Delta Tw \tag{1}$$

where K is a constant which is set according to the characteristic of the wheel speed sensor 20, and the period ΔTw is obtained through the interruption routine which is executed separately and which will be described later. Then, at Step S6, a wheel acceleration Gw of the rear road wheels RR, RL is calculated on the basis of the wheel speed Vw calculated at Step S5, in accordance with the following equations (2) and (3):

$$Int \times (\Delta Tw(n) + \Delta Tw(n-1))/2 \tag{2}$$

$$Gw(n) = (Vw(n) - Vw(n-1))/Int \tag{3}$$

where "Int" corresponds to a time interval of the interruption, Vw(n) and ΔTw(n) respectively correspond to the wheel speed and the period obtained in the present cycle of the routine, while Vw(n−1) and ΔTw(n−1) respectively correspond to the wheel speed and the period obtained in the previous cycle of the routine.

Accordingly, an estimated vehicle speed Vso is calculated at Step S7, on the basis of the wheel speed Vw calculated at Step S5 and an estimated vehicle acceleration Dvw which has been set according to the coefficient of friction of the road surface determined at Step S4, in accordance with the following Table 4.

TABLE 4

| | Estimated Vehicle Acceleration Dvw |
| --- | --- |
| Low-CF | 0.4 G |
| Mid.-CF | 0.6 G |
| High-CF | 1.1 G |

The estimated vehicle speed Vso is calculated in accordance with the following equation:

$$Vso = Max(Vw(n), Vso(n-1) - Dvw \cdot Int) \quad (4)$$

where Max (a, b) as in the above equation represents a function providing the larger one of "a" and "b", and Vso(n) corresponds to the estimated vehicle speed obtained in the present cycle, while Vso(n−1) corresponds to the estimated vehicle speed obtained in the previous cycle of the routine.

The program proceeds to Step S8, where it is determined how the hydraulic braking pressure in the wheel brake cylinders 10, 11 is regulated, in accordance with the wheel speed Vw, the wheel acceleration Gw and the estimated vehicle speed Vso obtained at previous Steps S5, S6 and S7 respectively. The program then proceeds to Step S9 where a signal for driving the solenoid 36 in response to the result determined at Step S8 is output from the output port OP1, so that the hydraulic braking pressure applied to the wheel brake cylinders 10, 11 is increased, decreased or held in response to the result. The above-described Steps S1 to S9 are repeatedly executed In the case where the average wheel speed Vw of the road wheels RR, RL is decreased rapidly, the hydraulic braking pressure is decreased to rotate the road wheels RR, RL, so that the road wheels RR, RL are prevented from being locked.

Next will be explained with reference to FIG. 6 the interruption routine, wherein the time interval between the interruption requirement made in the previous cycle and the interruption requirement made in the present cycle, i.e., the period ΔTw of the electric signal fed from the wheel speed sensor 20 is obtained At step S11, the present time "ta" is set by the free-run timer, and the program proceeds to Step S12 where a time difference between the present time "ta" and the time "tb" when the interruption requirement was made is calculated, so that the period ΔTw is obtained Then, at Step 13, the time "tb" is reset for a next interruption requirement. After execution of those Steps S11 to S13, the main routine shown in FIG. 5 is executed.

FIG. 7 shows a subroutine for the control of the hydraulic braking pressure (hereinafter, referred to as hydraulic pressure control) performed at Step S8 of the main routine. Firstly, at Step S21 the estimated vehicle speed Vso(n) is compared with a first predetermined speed V1 which is a standard speed for determining whether the vehicle is stopped, and which is set to be about 5 km/h in the present embodiment. If the estimated vehicle speed Vso(n) is equal to or more than the first predetermined speed V1, the program proceeds to Step S22. If the estimated vehicle speed Vso(n) is less than the first predetermined speed V1, the program proceeds to Step S37, so that the hydraulic pressure control is not performed. At Step S22, it is determined whether the brake switch 22 is in the ON or OFF condition. When the brake switch 22 is in the ON condition, the program proceeds to Step S23, whereas when the brake switch 22 is in the OFF condition, the program proceeds to Step S37, so that the hydraulic pressure control is not performed. Then, the program proceeds to Step S23 where it is determined whether a control flag is set or not. If the control flag is set, the program proceeds to Step S32, otherwise it proceeds to step S24. The control flag is a flag which is set at Step S28 when the hydraulic pressure control is initiated, and continuously set while the hydraulic pressure control is performed.

Then, at Step S24, it is determined whether the wheel speed Vw(n) of the rear road wheels RR, RL is less than the standard speed Vst(n) which is a value multiplied the estimated vehicle speed Vso(n) by a predetermined value (<1). If the wheel speed Vw(n) is less than the standard value Vst(n), it is determined that the rear road wheels RR, RL are slipping at the slip rate of more than 20%, and the program proceeds to Step S25. If the wheel speed Vw(n) is equal to or more than the standard speed Vst(n) (Vw(n)≧Vst(n)), it is determined that the rear road wheels RR, RL are not slipping, or determined that the slip rate is less than 20%, and the program proceeds to Step S37, so that the hydraulic pressure control is not performed The above-described standard speed Vst(n) is used for controlling the braking force to maintain the slip rate of the rear road wheels at approximately 20% so that the maximum coefficient of friction is obtained.

At Step S25, it is determined whether the wheel acceleration Gw(n) of the rear road wheels RR, RL is less than a predetermined acceleration G1. If the wheel acceleration Gw(n) is less than the predetermined acceleration G1 (Gw(n)<G1), it is determined that the rear road wheels RR, RL are in a condition immediately before they are locked Then, the program proceeds to Step S26 where the hydraulic braking pressure in the wheel brake cylinders 10, 11 of the road wheels RR, RL is decreased. If the wheel acceleration Gw(n) is equal to or more than the predetermined acceleration G1 (Gw(n)≧G1), it is determined that the road wheels RR, RL are not locked immediately, and the program proceeds to Step S37, so that the hydraulic pressure control is not performed.

At Step S26, a mode flag is set to a decrease mode, whereby the hydraulic braking pressure applied to the wheel brake cylinders 10, 11 is decreased to prevent the road wheels RR, RL from being locked Then, the program proceeds to Step S27 where it is determined whether a control start timer has counted a predetermined time Ts or more. This control start timer is arranged to start counting at the time when it is determined that the wheel acceleration Gw(n) is less than the predetermined acceleration G1 and arranged to count a duration of Vw(n)<Vst(n) and Gw(n)<G1, i.e., the condition for initiating the decrease mode. If the control start timer has counted the predetermined time Ts or more, the program proceeds to Step S28 where the control flag is set. The control flag is arranged to be set continuously unless the estimated vehicle speed Vso(n) is less than the first predetermined speed V1 at Step S21, or unless the brake switch 22 is turned off at Step S22. If the control start timer counts less than the predetermined time Ts, the program proceeds to Step S29 where the control start timer is incremented (+1), and then proceeds to Step S30. Thus, unless the control start timer counts the predetermined time Ts or more, the control flag is not set. In this embodiment, the predetermined time Ts is set to be 40 milliseconds.

Then, the program proceeds to Step S30 where a solenoid timer starts The solenoid timer is included in the microprocessor MPU to control the duty ratio of the electric signals output from the output port OP1, and thereby to control the electric power fed to the solenoid 36 in accordance with a mode set by the mode flag. There are provided four kinds of mode set by the mode flag, such as DECREASE, INCREASE, HOLD and DIRECT SUPPLY. When the mode flag is set to DECREASE, the hydraulic braking pressure applied to the wheel brake cylinders 10, 11 is decreased by the actuator 12 which is controlled by the solenoid timer. When the mode flag is set to INCREASE, the above hydraulic braking pressure is increased by the actuator 12. When the mode flag is set to HOLD, the above hydraulic braking pressure is held as it is by the actuator 12. Further, when the mode flag is set to DIRECT SUPPLY, the wheel brake cylinders 10, 11 are directly communicated with the master cylinder 3 through the actuator 12. Then, the program returns to the main routine at Step S31.

In the case where the control flag is set at Step S23, the program proceeds to Step S32 where it is determined whether the wheel speed $Vw(n)$ of the rear road wheels RR, RL is less than the standard speed $Vst(n)$. If the wheel speed $Vw(n)$ is equal to or more than the standard speed $Vst(n)$ ($Vw(n) \geq Vst(n)$), the program proceeds to Step S33 where the mode flag is set to INCREASE, so that the hydraulic braking pressure applied to the wheel brake cylinders 10, 11 is increased at Step S30. If the wheel speed $Vw(n)$ is less than the standard speed $Vst(n)$, the program proceeds to Step S34 where it is determined whether the wheel acceleration $Gw(n)$ is less than the predetermined acceleration G1. When it is determined that the wheel acceleration $Gw(n)$ is less than the predetermined acceleration G1, the program proceeds to Step S35 where the mode flag is set to DECREASE, so that the hydraulic braking pressure applied to the wheel brake cylinders 10, 11 is decreased at Step S30. If the wheel acceleration $Gw(n)$ is equal to or more than the predetermined acceleration G1, the program proceeds to Step S36 where the mode flag is set to HOLD, so that the hydraulic braking pressure applied to the wheel brake cylinders 10, 11 is held as it is at Step S30. With the above Steps S32 to S36 executed repeatedly, the slip between the road wheels RR, RL and the road surface is controlled to be almost constant, so that a stable braking force is obtained Thus, the Steps S32 to S36 correspond to the pressure control mode according to the present invention.

In the case where the estimated vehicle speed $Vso(n)$ is determined to be less than the first predetermined speed V1 at Step 21, or the brake switch 22 is determined to be in the OFF condition at Step S22, the program proceeds to Steps S37, S38 and the above hydraulic pressure control is terminated. Before the control start timer counts the predetermined time Ts at Step S27, if the wheel speed $Vw(n)$ is equal to or more than the standard speed $Vst(n)$ at Step S24, or if the wheel acceleration $Gw(n)$ is equal to or more than the predetermined acceleration G1, the program proceeds to Steps S37, S38, so that the hydraulic pressure control is not performed. At Step S37, the mode flag is set to DIRECT SUPPLY, so that the wheel brake cylinders 10, 11 are directly communicated with the master cylinder 3 at Step S30. Consequently, the normal braking operation is performed. Then, the control flag is reset at Step S38, and the control start timer is cleared at Step S39.

Figure 8A:
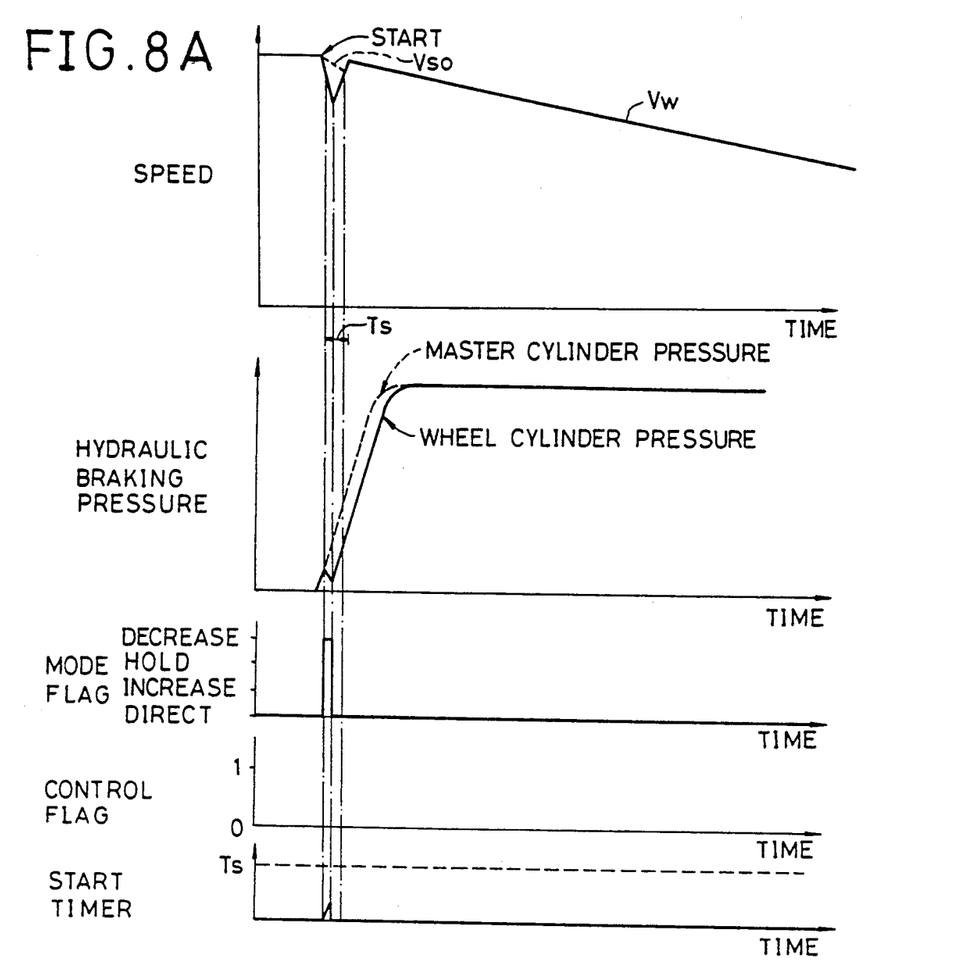
FIG. 8A is a timing chart showing the operation of anti-skid control of an embodiment of the present invention.
Figure 8B:
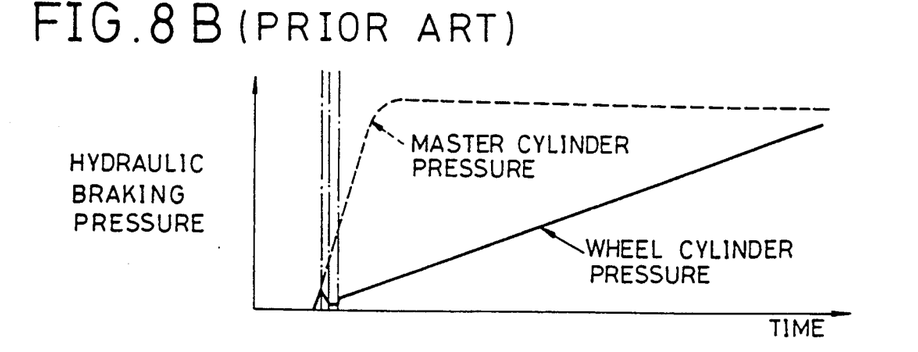
FIG. 8B is a timing chart showing the operation of anti-skid control of the prior art.

According to the subroutine for the hydraulic pressure control shown in FIG. 7, unless the duration of the condition for initiating the DECREASE mode, i.e., the conditions of $Vw(n)<Vst(n)$ and $Gw(n)<G1$ is equal to or more than the predetermined time Ts, the control flag will not be set, so that the hydraulic pressure control will not be performed. In the case where the duration of the condition for initiating the DECREASE mode is less than the predetermined time Ts, if it is determined negative at Steps 24 and 25, the mode flag is set to DIRECT SUPPLY to prohibit the hydraulic pressure control, so that the normal braking operation is performed. FIG. 8 shows a timing chart in the case where the vehicle is running on a rough road, or the road wheel rides on protrusions of the road, or the case where the wheel speed is momentarily decreased due to backlash of gears in a power train in the anti-skid control system for preventing only driven wheels from being locked Due to the momentary drop of the wheel speed Vw as shown in FIG. 8A, such condition that the wheel speed Vw is less than the standard speed $Vst(n)$ and that the wheel acceleration Gw is less than the predetermined acceleration G1 is effected momentarily. In the case where the duration of the condition for initiating the DECREASE mode is less than the predetermined time Ts, the control flag is not set, while the mode flag is set to DECREASE as long as the condition for initiating the DECREASE mode is effected. During this period, the hydraulic braking pressure in the wheel brake cylinders 10, 11 is decreased, but the hydraulic pressure control is prohibited immediately after that condition is failed, so that the mode flag is set to DIRECT SUPPLY. Thus, the hydraulic braking pressure in the wheel brake cylinders 10, 11 is rapidly increased through normal braking operation. In the prior system as shown in FIG. 8B, when the condition for initiating the DECREASE mode is momentarily effected by the momentary drop of the wheel speed, the anti-skid control, i.e., the hydraulic pressure control is initiated, so that the increasing gradient of the hydraulic braking pressure in the wheel brake cylinders 10, 11 is very gradual to cause lack of braking force. Whereas, in the present embodiment, since the hydraulic braking pressure in the wheel brake cylinders 10, 11 is rapidly increased through the normal braking operation immediately after the failure of the condition for initiating the DECREASE mode, and its increasing gradient is made equal to that in the normal braking operation, the delay in increase of the hydraulic braking pressure in the wheel brake cylinders 10, 11 in response to increase of the hydraulic braking pressure of the master cylinder 3 is very small, so that the lack of braking force is prevented.

Figure 9:
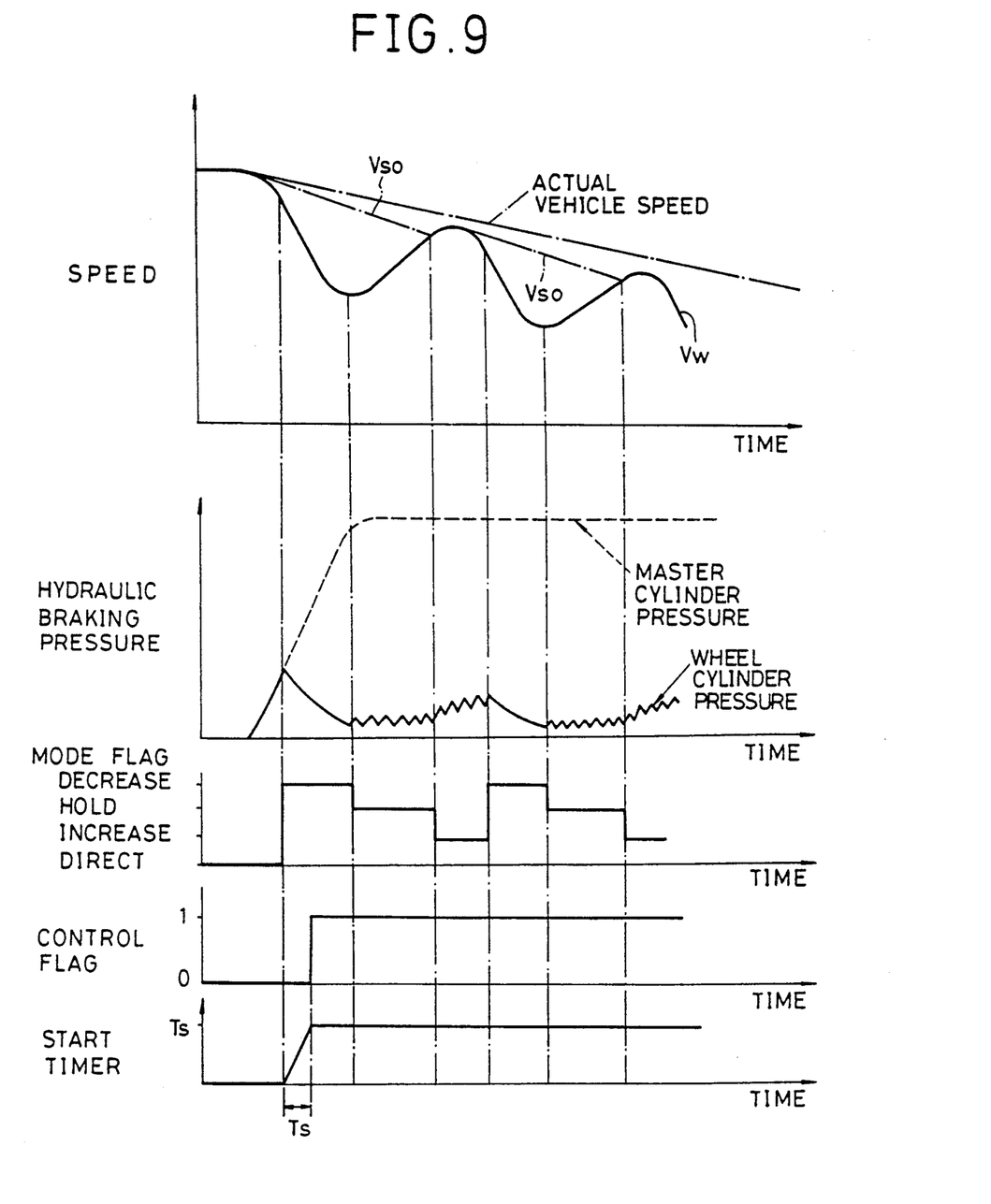
FIG. 9 is a timing chart showing the operation of anti-skid control of an embodiment of the present invention.

In order to prevent the lack of braking force as mentioned above, it may be considered to reduce the standard speed Vst so as to moderate the sensitivity for initiation of the anti-skid control. However, this will result in that the timing for decreasing the hydraulic braking pressure is always delayed, so that the drop of the wheel speed Vw becomes large to cause locking of the road wheels Whereas, in the present embodiment, the anti-skid control is performed as shown in FIG. 9. Namely, while at least the condition for initiating the DECREASE mode is effected, the mode flag is set to DECREASE, whereby the hydraulic braking pressure in the wheel brake cylinders 10, 11 is decreased. When the duration of that condition is less than the predetermined time Ts as shown in FIG. 8A, the control flag is not set to prohibit the hydraulic pressure control. When the duration of that condition is equal to or more than the predetermined time Ts, the control flag is set to perform the hydraulic braking pressure control. Consequently, according to the present embodiment, the lack of braking force is effectively prevented without causing the delay of the timing for decreasing the hydraulic braking pressure It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automative vehicle for installation in a vehicle braking system having a wheel brake cylinder for applying a braking force to a road wheel and pressure generating means for supplying a hydraulic braking pressure to said wheel brake cylinder, comprising:

actuating means disposed in a hydraulic circuit between said pressure generating means and said wheel brake cylinder for controlling said hydraulic braking pressure applied to said wheel brake cylinder;

wheel speed detecting means for detecting a wheel speed of said road wheel;

determination means for determining in response to said wheel speed detected by said wheel speed detecting means whether a condition for decreasing said hydraulic braking pressure applied to said wheel brake cylinder is effected;

pressure control means for controlling said actuating means in response to a result of determination in said determination means, said pressure control means providing a decrease mode for decreasing said hydraulic braking pressure applied to said wheel brake cylinder, a direct supply mode for directly communicating said pressure generating means with said wheel brake cylinder, and a pressure control mode for controlling said hydraulic braking pressure applied to said wheel brake cylinder to prevent said road wheel from being locked and increasing said pressure to achieve the maximum possible braking force without locking of the wheels, said pressure control means initiating said decrease mode to decrease said hydraulic braking pressure when said condition is effected in said determination means and continuing said decrease mode for a predetermined period of time, timer controlled valve means associated with said pressure control means for changing said decrease mode to said pressure control mode when the condition for decreasing the pressure is continuously effected for said predetermined period of time after said decrease mode is initiated, and changing said decrease mode to said direct supply mode when said condition for decreasing the pressure is no longer effective in said determination means during said predetermined period of time after said decrease mode is initiated.

2. An anti-skid control system for an automotive vehicle as set forth in claim 1, wherein said determination means provides a wheel acceleration of said road wheel calculated from said wheel speed and determines that said condition is effected when said wheel speed is less than a predetermined speed and said wheel acceleration is less than a predetermined acceleration.

3. An anti-skid control system for an automotive vehicle as set forth in claim 2, wherein said pressure control means provides for said pressure control mode an increase mode for increasing said hydraulic braking pressure applied to said wheel brake cylinder and a decrease mode for decreasing said hydraulic braking pressure, and selects one mode thereof to prevent said road wheel from being locked.

4. An anti-skid control system for an automotive vehicle as set forth in claim 2, wherein said pressure control means provides for said pressure control mode an increase mode for increasing said hydraulic braking pressure applied to said wheel brake cylinder, a decrease mode for decreasing said hydraulic braking pressure and a hold mode for holding said hydraulic braking pressure, and selects one mode thereof to prevent said road wheel from being locked 5. An anti-skid control system for an automotive vehicle as set forth in claim 4, wherein said pressure control means provides said increase mode when said wheel speed is less than said predetermined speed, and wherein, when said wheel speed is equal to or more than said predetermined speed, said pressure control means provides said decrease mode when said wheel acceleration is less than said predetermined acceleration, and provides said hold mode when said acceleration is equal to or more than said predetermined acceleration.

6. An anti-skid control system for an automotive vehicle as set forth in claim 5, wherein said actuating means comprises a changeover valve selectively communicated with either said pressure generating means or a reservoir for storing a braking fluid under a low pressure comparing with said hydraulic braking pressure to increase or decrease said hydraulic braking pressure applied to said wheel brake cylinder.

* * * * *